US012794020B2

(12) United States Patent
Nakashima

(10) Patent No.: US 12,794,020 B2
(45) Date of Patent: Nov. 10, 2026

(54) BATTERY PRODUCTION METHOD, BATTERY PRODUCTION APPARATUS, AND BATTERY

(71) Applicant: TOYOTA JIDOSHA KABUSHIKI KAISHA, Toyota (JP)

(72) Inventor: Satoshi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 764 days.

(21) Appl. No.: 17/987,936

(22) Filed: Nov. 16, 2022

(65) Prior Publication Data

US 2023/0163362 A1 May 25, 2023

(30) Foreign Application Priority Data

Nov. 22, 2021 (JP) ................................ 2021-189581

(51) Int. Cl.
*H01M 10/058* (2010.01)
*B23K 20/10* (2006.01)
(Continued)

(52) U.S. Cl.
CPC .......... *H01M 10/058* (2013.01); *B23K 20/10* (2013.01); *H01M 10/0404* (2013.01);
(Continued)

(58) Field of Classification Search
CPC ............ H01M 50/105; H01M 50/178; H01M 10/0585; H01M 10/0404; H01M 10/04; B23K 20/10; B23K 20/106; Y02P 70/50
See application file for complete search history.

(56) References Cited

U.S. PATENT DOCUMENTS

2001/0028978 A1* 10/2001 Inoue .................. B23K 20/106
29/730
2006/0127760 A1* 6/2006 Hatta ............... H01M 10/0431
429/185
(Continued)

FOREIGN PATENT DOCUMENTS

CN 103071910 A 5/2013
CN 113290312 A 8/2021
(Continued)

OTHER PUBLICATIONS

Yano (JPH-07266420-A) machine translation of Description (corresponding foreign publication provided in Nov. 16, 2022 IDS) (Year: 1995).*

(Continued)

*Primary Examiner* — Jessie Walls-Murray
(74) *Attorney, Agent, or Firm* — Dinsmore & Shohl LLP

(57) ABSTRACT

An electrode assembly is accommodated in a laminated casing. A pressure-applied portion is formed by sandwiching at least a portion of a peripheral edge of the laminated casing between a first horn and a second horn. A sealed portion is formed by applying ultrasonic vibration from each of the first horn and the second horn to the pressure-applied portion. The first horn has a first vibration direction. The second horn has a second vibration direction. The first vibration direction is parallel to a thickness direction of the laminated casing. The second vibration direction is non-parallel to the first vibration direction.

17 Claims, 7 Drawing Sheets

(51) Int. Cl.
*H01M 10/04* (2006.01)
*H01M 50/105* (2021.01)
*H01M 50/124* (2021.01)
*H01M 50/178* (2021.01)
*H01M 50/183* (2021.01)

(52) U.S. Cl.
CPC ....... *H01M 50/105* (2021.01); *H01M 50/124* (2021.01); *H01M 50/178* (2021.01); *H01M 50/183* (2021.01)

(56) References Cited

U.S. PATENT DOCUMENTS

| | | | | |
|---|---|---|---|---|
| 2011/0003185 | A1* | 1/2011 | Kritzer | H01M 10/60 429/120 |
| 2011/0244315 | A1 | 10/2011 | Yoon | |
| 2013/0189570 | A1 | 7/2013 | Park et al. | |
| 2018/0261807 | A1* | 9/2018 | Lim | H01M 50/557 |
| 2020/0044229 | A1* | 2/2020 | Yanagi | H01M 50/105 |
| 2020/0185675 | A1* | 6/2020 | Lee | H01M 10/52 |
| 2021/0370613 | A1* | 12/2021 | Klinstein | B29C 66/73921 |
| 2023/0048295 | A1* | 2/2023 | Lee | H01M 10/0481 |
| 2023/0173606 | A1* | 6/2023 | Chung | B29C 66/944 228/110.1 |
| 2023/0261207 | A1* | 8/2023 | Higashi | H01M 10/04 429/231.8 |

FOREIGN PATENT DOCUMENTS

| | | | |
|---|---|---|---|
| JP | H07-266420 | A | 10/1995 |
| JP | 2007-250310 | A | 9/2007 |

OTHER PUBLICATIONS

CN 103071910 A (as cited in Oct. 20, 2025 IDS) translation of Fig. 8 (Year: 2013).*

Non-Final Office Action dated Jun. 23, 2026, issued to U.S. Appl. No. 18/616,322 (38 pages).

* cited by examiner

BATTERY PRODUCTION METHOD, BATTERY PRODUCTION APPARATUS, AND BATTERY

CROSS REFERENCE TO RELATED APPLICATIONS

This nonprovisional application claims priority to Japanese Patent Application No. 2021-189581 filed on Nov. 22, 2021, with the Japan Patent Office, the entire contents of which are hereby incorporated by reference.

BACKGROUND

Technical Field

The present disclosure relates to a battery production method, a battery production apparatus, and a battery.

Description of the Background Art

Japanese Patent Laying-Open No. 7-266420 discloses an ultrasonic welding apparatus including a second ultrasonic horn portion that outputs an ultrasonic wave having a frequency different from a vibration frequency of a first ultrasonic horn portion.

SUMMARY

A laminate film is used as a casing of a battery. Such a casing composed of a laminate film is referred to as a "laminated casing". A battery including the laminated casing is referred to as a "laminate-type battery".

For example, an electrode assembly (power generation element) is accommodated in the laminated casing. At the peripheral edge of the laminated casing, the laminated casing is welded, thereby forming a sealed portion.

Generally, the sealed portion is formed by heat sealing. That is, the sealed portion is formed by pressing a heat bar against the laminated casing. When ultrasonic welding is employed instead of the heat sealing, it is expected to improve productivity, for example. However, the ultrasonic welding tends to provide welding strength lower than that in the heat sealing.

It is an object of the present disclosure to improve welding strength in ultrasonic welding.

Hereinafter, the technical configurations, functions and effects of the present disclosure will be described. However, a mechanism of function in the present specification include presumption. The mechanism of function does not limit the technical scope of the present disclosure.

1. A battery production method includes the following (a) to (c).

(a) An electrode assembly is accommodated in a laminated casing.

(b) A pressure-applied portion is formed by sandwiching at least a portion of a peripheral edge of the laminated casing between a first horn and a second horn.

(c) A sealed portion is formed by applying ultrasonic vibration from each of the first horn and the second horn to the pressure-applied portion.

The first horn has a first vibration direction. The second horn has a second vibration direction.

The first vibration direction is parallel to a thickness direction of the laminated casing. The second vibration direction is non-parallel to the first vibration direction.

Generally, the vibration direction of a horn in ultrasonic welding is a direction perpendicular to a joining surface (processing target). When forming a sealed portion in a laminated casing, the vibration direction of the horn is parallel to the thickness direction of the laminated casing.

In the battery production method of the present disclosure, the first horn and the second horn are used. The first horn is vibrated in parallel with the thickness direction of the laminated casing. It is expected to melt a resin by the vibration of the first horn. The second horn is vibrated in a direction different from that of the first horn. With the vibration of the second horn, the molten resin can be stirred. Due to the vibrations in the two directions, it is expected to mix the resin in a wide range at the joining interface. With the mixing of the resin, it is expected to improve the welding strength.

2. The second vibration direction may be orthogonal to the first vibration direction.

Since the vibration direction of the second horn is orthogonal to the vibration direction of the first horn, it is expected to improve efficiency of stirring of the resin and the like, for example.

3. The first horn may have an amplitude twice or less as large as a thickness of the laminated casing.

Since the amplitude of the first horn is twice or less as large as the thickness of the laminated casing (laminate film), damage to the laminate film is expected to be reduced.

4. The second horn may be vibrated in synchronism with the first horn.

The expression "in synchronism" means that the position of the second horn is specified when the position of the first horn is specified during the vibration, because the second horn is vibrated in conjunction with the first horn. For example, when the first horn is located at the end of the vibration, the second horn may be vibrated to be located at the center of the vibration. Since the second horn is vibrated in synchronism with the first horn, welding strength is expected to be improved, for example.

5. At least one of the first horn and the second horn may include a knurled portion. The knurled portion may be in contact with the laminated casing.

The "knurled portion" represents a portion having been through a knurling process. By bringing the knurled portion into contact with the laminated casing, it is expected to improve efficiency of melting of the resin, efficiency of stirring of the resin, and the like, for example.

6. The sealed portion may include a first region and a second region. In the first region, portions of the laminated casing are welded to each other. In the second region, an electrode tab is sandwiched between the portions of the laminated casing. At least one of the first horn and the second horn may include a first portion and a second portion. The first portion forms the first region. The second portion forms the second region. The second portion is located backward with respect to the first portion in the thickness direction of the laminated casing.

The laminate-type battery can include the electrode tab. The electrode tab is joined to the electrode assembly. The electrode tab is led out from the inside to outside of the laminated casing. For example, it is required to perform ultrasonic welding with the electrode tab being sandwiched. When the ultrasonic welding is performed with the electrode tab sandwiched, a step is formed by the electrode tab, with the result that pressure applying force may become large locally. Since the portion of the horn corresponding to the electrode tab is located backward, it is expected to attain a small pressure difference between the region (second region)

corresponding to the electrode tab and the other region (the first region). Thus, it is expected to reduce a difference in welding strength between the first region and the second region, for example.

7. A battery production apparatus forms a sealed portion at a peripheral edge of a laminated casing in which an electrode assembly is accommodated. The battery production apparatus includes a first horn, a second horn, a pressure applying apparatus, a first ultrasonic wave generating apparatus, and a second ultrasonic wave generating apparatus. The first horn and the second horn are configured to sandwich at least a portion of the peripheral edge of the laminated casing between the first horn and the second horn. The pressure applying apparatus is configured to apply pressure applying force to at least one of the first horn and the second horn. The first ultrasonic wave generating apparatus is configured to apply, to the first horn, ultrasonic vibration in a first vibration direction. The second ultrasonic wave generating apparatus is configured to apply, to the second horn, ultrasonic vibration in a second vibration direction. The first vibration direction is parallel to a thickness direction of the laminated casing. The second vibration direction is non-parallel to the first vibration direction.

In the battery production apparatus of “7”, the battery production method of “1” can be performed.

8. In the battery production apparatus, the second vibration direction may be orthogonal to the first vibration direction.

In the battery production apparatus of “8”, the battery production method of “2” can be performed.

9. In the battery production apparatus, at least one of the first horn and the second horn may include a knurled portion. The knurled portion may be configured to be in contact with the laminated casing.

In the battery production apparatus of “9”, the battery production method of “5” can be performed.

10. The sealed portion may include a first region and a second region. In the first region, portions of the laminated casing are welded to each other. In the second region, an electrode tab is sandwiched between the portions of the laminated casing.

In the battery production apparatus, at least one of the first horn and the second horn may include a first portion and a second portion. The first portion is configured to form the first region. The second portion is configured to form the second region. The second portion is located backward with respect to the first portion in the thickness direction of the laminated casing.

In the battery production apparatus of “10”, the battery production method of “6” can be performed.

11. The battery includes a laminated casing and an electrode assembly. The laminated casing accommodates the electrode assembly. The laminated casing includes a sealed portion at at least a portion of a peripheral edge of the laminated casing. The sealed portion includes a first surface and a second surface. The second surface is a surface opposite to the first surface. A processing mark is formed on the first surface or the second surface. The processing mark extends in a direction orthogonal to a thickness direction of the laminated casing.

It is considered that the vibration provided by the first horn (vibration in the thickness direction) is less likely to form a processing mark (scratch) on an outer surface of the laminated casing. The second horn is vibrated in non-parallel with the first horn. The vibration provided by the second horn can form a processing mark on the outer surface of the laminated casing. The processing mark can be formed along the second vibration direction (vibration direction of the second horn).

The foregoing and other objects, features, aspects and advantages of the present disclosure will become more apparent from the following detailed description of the present disclosure when taken in conjunction with the accompanying drawings.

DETAILED DESCRIPTION

Definitions of Terms, Etc

Figure 1:
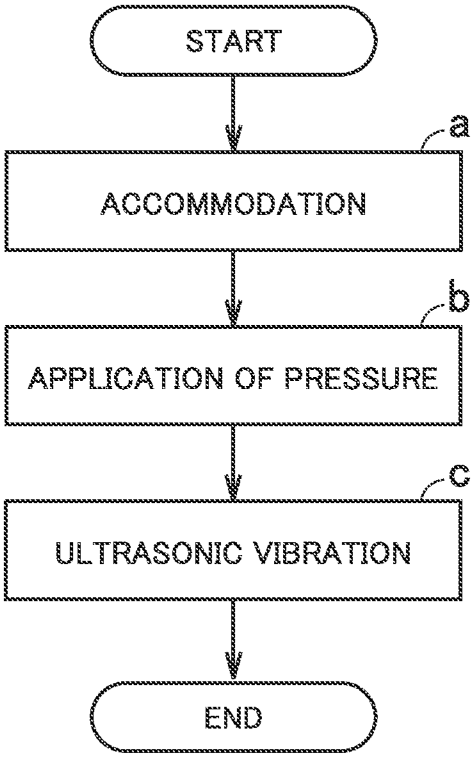
FIG. 1 is a schematic flowchart of a battery production method according to the present embodiment.

Hereinafter, an embodiment (hereinafter, simply referred to as “the present embodiment”) of the present disclosure will be described. It should be noted that the present embodiment does not limit the technical scope of the present disclosure.

In the present specification, the terms “comprise”, “include”, and “have” as well as their variants (such as “be composed of”) are open-end expressions. Each of the open-end expressions may or may not further include additional element(s). The expression “consist of” is a closed expression. It should be noted that even the closed expression does not exclude impurit(ies) that are involved in normal cases, as well as additional element(s) irrelevant to the technology of the present disclosure. The expression “consist essentially of” is a semi-closed expression. The semi-closed expression permits addition of element(s) that do not essentially affect basic and novel characteristics of the technology of the present disclosure.

In the present specification, each of the words “may” and “can” is used in a permissible sense, i.e., “have a possibility to do”, rather than in a mandatory sense, i.e., “must do”. In the present specification, elements represented by singular forms may include plural forms as well, unless otherwise stated particularly.

In a method described in the present specification, an order of execution of a plurality of steps, operations, actions or the like is not limited to the described order unless otherwise stated particularly. For example, a plurality of steps may be performed simultaneously. For example, a plurality of steps may be performed earlier or later.

Geometric terms in the present specification (for example, the terms such as “parallel”, “perpendicular”, and “orthogonal”) should not be interpreted in a strict sense. For example, the term “parallel” may be deviated to some extent from the strict definition of the term “parallel”. The geometric terms in the present specification can include, for example, a tolerance, an error, and the like in terms of design, operation, manufacturing, and the like. A dimensional relation in each of the figures may not coincide with an actual dimensional relation. In order to facilitate understanding of the technology of the present disclosure, the dimensional relation (length, width, thickness, or the like) in each figure may be changed. Further, part of configurations may be omitted.

In the present specification, the expression "when viewed in a plan view" indicates to view an object (for example, a laminated casing, a battery, or the like) along a line of sight parallel to the thickness direction of the object. The plan view can be shown in the form of a top view or a bottom view, for example.

In the present specification, a numerical range such as "m to n %" includes the lower and upper limit values unless otherwise stated particularly. That is, "m to n %" indicates a numeric value range of "more than or equal to m % and less than or equal to n %". Moreover, the expression "more than or equal to m % and less than or equal to n %" includes "more than m % and less than n %". Further, a numerical value freely selected from the numerical range may be employed as a new lower or upper limit value. For example, a new numerical range may be set by freely combining a numerical value described in the numerical range with a numerical value described in another portion of the present specification, table or figure.

In the present specification, all the numerical values are modified by the term "about". The term "about" can mean, for example, ±5%, ±3%, ±1%, or the like. All the numerical values can be approximate values that can be changed depending on a manner of use of the technology of the present disclosure. All the numerical values can be indicated as significant figures. A measurement value can be an average value in multiple measurements. The number of measurements may be more than or equal to 3, more than or equal to 5, or more than or equal to 10. In general, as the number of measurements is larger, the reliability of the average value is expected to become higher. The measurement value can be rounded off based on the number of digits of the significant figure. The measurement value can include an error resulting from a detection limit of a measurement apparatus or the like, for example.

The present embodiment can be applied to any battery system as long as a laminated casing is used. The present embodiment may be applied to, for example, a lithium ion battery or the like. The lithium ion battery may include a liquid electrolyte, a gel electrolyte, or a solid electrolyte. The present embodiment may be applied to, for example, a nickel-metal hydride battery or the like. The nickel-metal hydride battery may be of a bipolar type, for example.

<Battery Production Method>

FIG. 1 is a schematic flowchart of a battery production method according to the present embodiment. Hereinafter, the expression "battery production method according to the present embodiment" can be simply referred to as "the present production method". The present production method includes "(a) accommodation", "(b) application of pressure", and "(c) ultrasonic vibration". It should be noted that the order in FIG. 1 is for the sake of convenience. For example, "(b) application of pressure" and "(c) ultrasonic vibration" may be performed substantially simultaneously.

<<(a) Accommodation>>

Figure 2:
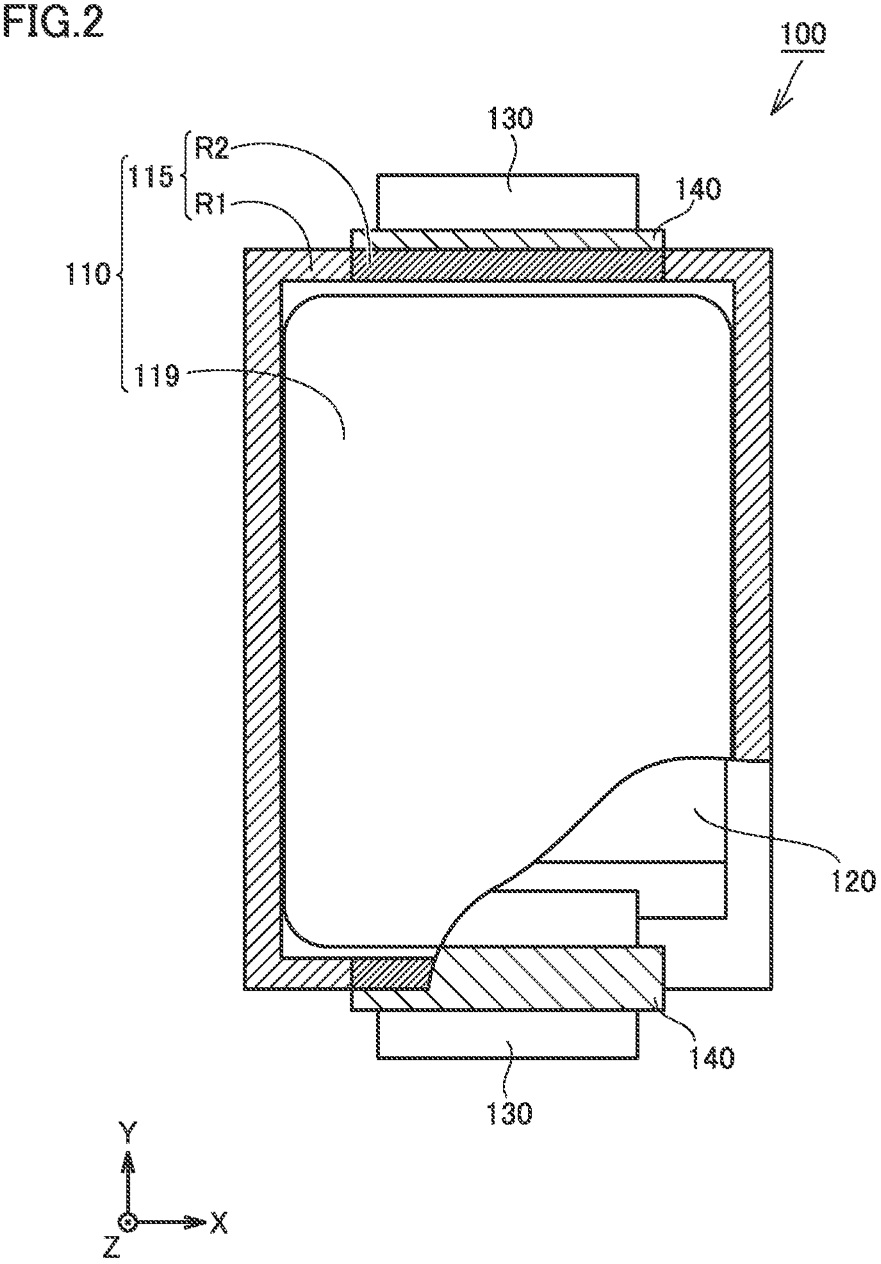
FIG. 2 is a schematic top view of a battery according to the present embodiment.

FIG. 2 is a schematic top view of a battery according to the present embodiment. Hereinafter, the expression "battery according to the present embodiment" can be simply referred to as "the present battery". The present production method includes accommodating an electrode assembly 120 in a laminated casing 110.

Laminated casing 110 includes a laminate film. Laminated casing 110 is in the form of a pouch. Laminated casing 110 may consist of one laminate film. Laminated casing 110 may include a plurality of laminate films.

Laminated casing 110 may include, for example, an accommodation portion 119. Accommodation portion 119 may be, for example, a recess in the form of a tray. Accommodation portion 119 may extend along the outer shape of electrode assembly 120. Electrode assembly 120 is accommodated in accommodation portion 119. Further, for example, an electrolyte solution may be introduced into accommodation portion 119.

Portions of the laminate film are stacked on each other at the periphery edge of accommodation portion 119. The laminate film includes a resin layer. At the peripheral edge of accommodation portion 119, a contact surface between portions of the resin layer are formed.

<<(b) Application of Pressure>>

Figure 3:
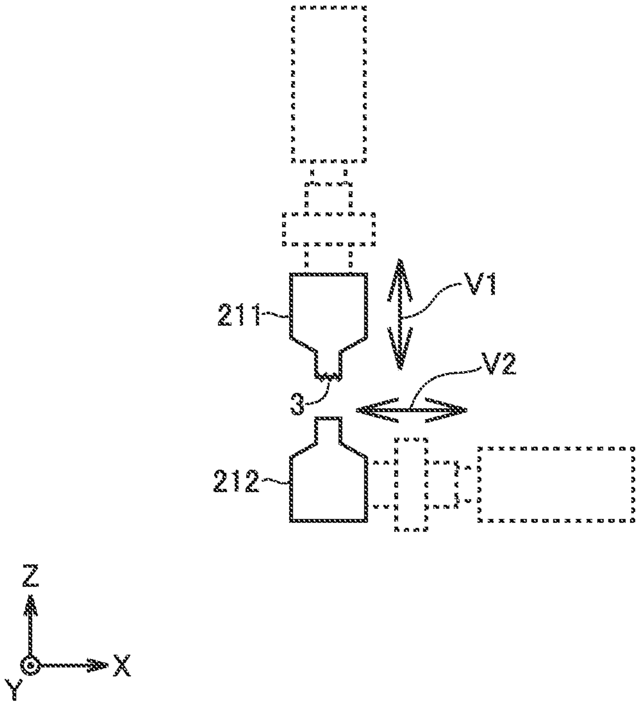
FIG. 3 is a first conceptual diagram showing exemplary first horn and second horn according to the present embodiment.

FIG. 3 is a first conceptual view showing exemplary first horn and second horn according to the present embodiment. The present production method includes forming a pressure-applied portion by sandwiching at least a portion of the peripheral edge of laminated casing 110 between a first horn 211 and a second horn 212.

The pressure-applied portion is formed on the contact surface between the portions of the resin layer. The pressure-applied portion represents a portion to which pressure is applied. The magnitude of the pressure may be appropriately adjusted to obtain a desired welding strength.

Each of first horn 211 and second horn 212 can transmit ultrasonic vibration to a workpiece. Each of first horn 211 and second horn 212 may be composed of, for example, an aluminum (Al) alloy, a titanium (Ti) alloy, or the like. At least one of first horn 211 and second horn 212 may include a knurled portion 3. On a surface of knurled portion 3, a fine recess/projection pattern is engraved. The recess/projection pattern may be, for example, straight or cross. During ultrasonic vibration, knurled portion 3 can be in contact with laminated casing 110. Since the vibration is transmitted by knurled portion 3, it is expected to improve efficiency of melting of the resin, efficiency of stirring of the resin, and the like, for example.

<<(c) Ultrasonic Vibration>>

The present production method includes forming a sealed portion 115 by applying ultrasonic vibration from each of first horn 211 and second horn 212 to the pressure-applied portion. With the formation of sealed portion 115, the present battery 100 can be completed.

First horn 211 has a first vibration direction V1 (see FIG. 3). Second horn 212 has a second vibration direction V2. First vibration direction V1 is parallel to the thickness direction (Z axis direction in FIG. 2) of laminated casing 110. Second vibration direction V2 is non-parallel to first vibration direction V1. With the vibration of first horn 211, the resin at the pressure-applied portion is melted. With the vibration of second horn 212, the molten resin is stirred. Due to the vibrations in the two directions, it is expected to mix the resin in a wide range at the joining interface. With the mixing of the resin, it is expected to improve the welding strength.

The amplitude of the vibration of first horn 211 may be, for example, twice or less as large as the thickness of laminated casing 110. Thus, damage to laminated casing 110 can be reduced, for example. For example, the amplitude of first horn 211 may be 0.5 to 1.8 times or 1 to 1.5 times as large as the thickness of laminated casing 110.

Second vibration direction V2 may be any direction as long as second vibration direction V2 is non-parallel to first vibration direction V1. An angle formed by second vibration direction V2 and first vibration direction V1 may be, for example, 30 to 150°. Second vibration direction V2 may be orthogonal to first vibration direction V1, for example. When second vibration direction V2 is orthogonal to first vibration direction V1, it is expected to improve the efficiency of stirring of the resin and the like, for example. When second vibration direction V2 is orthogonal to first vibration direction V1, second vibration direction V2 may be any direction in a plane orthogonal to first vibration direction V1. Second vibration direction V2 may be, for example, parallel to the Y axis direction in FIG. 2, or may be parallel to the X axis direction in FIG. 2.

For example, each of first horn 211 and second horn 212 may be vibrated independently. For example, second horn 212 may be vibrated in synchronism with first horn 211. For example, when first horn 211 is located at the end of the vibration, second horn 212 may be vibrated to be located at the center of the vibration. For example, when first horn 211 is located at the center of the vibration, second horn 212 may be vibrated to be located at the end of the vibration. Since second horn 212 is vibrated in synchronism with first horn 211, the welding strength is expected to be improved, for example.

Each of the tips of first horn 211 and second horn 212 may be in the form of a frame. During the ultrasonic vibration, the tips of first horn 211 and second horn 212 may surround electrode assembly 120 when viewed in a plan view. First horn 211 and second horn 212 may press sealed portion 115 uniformly, for example. For example, pressure applying force may be adjusted in accordance with the recesses/projections (steps) of sealed portion 115. For example, at a portion corresponding to an electrode tab 130, the pressure applying force tends to be locally large. Also, the welding strength may be varied due to the variation in the pressure applying force.

Figure 4:
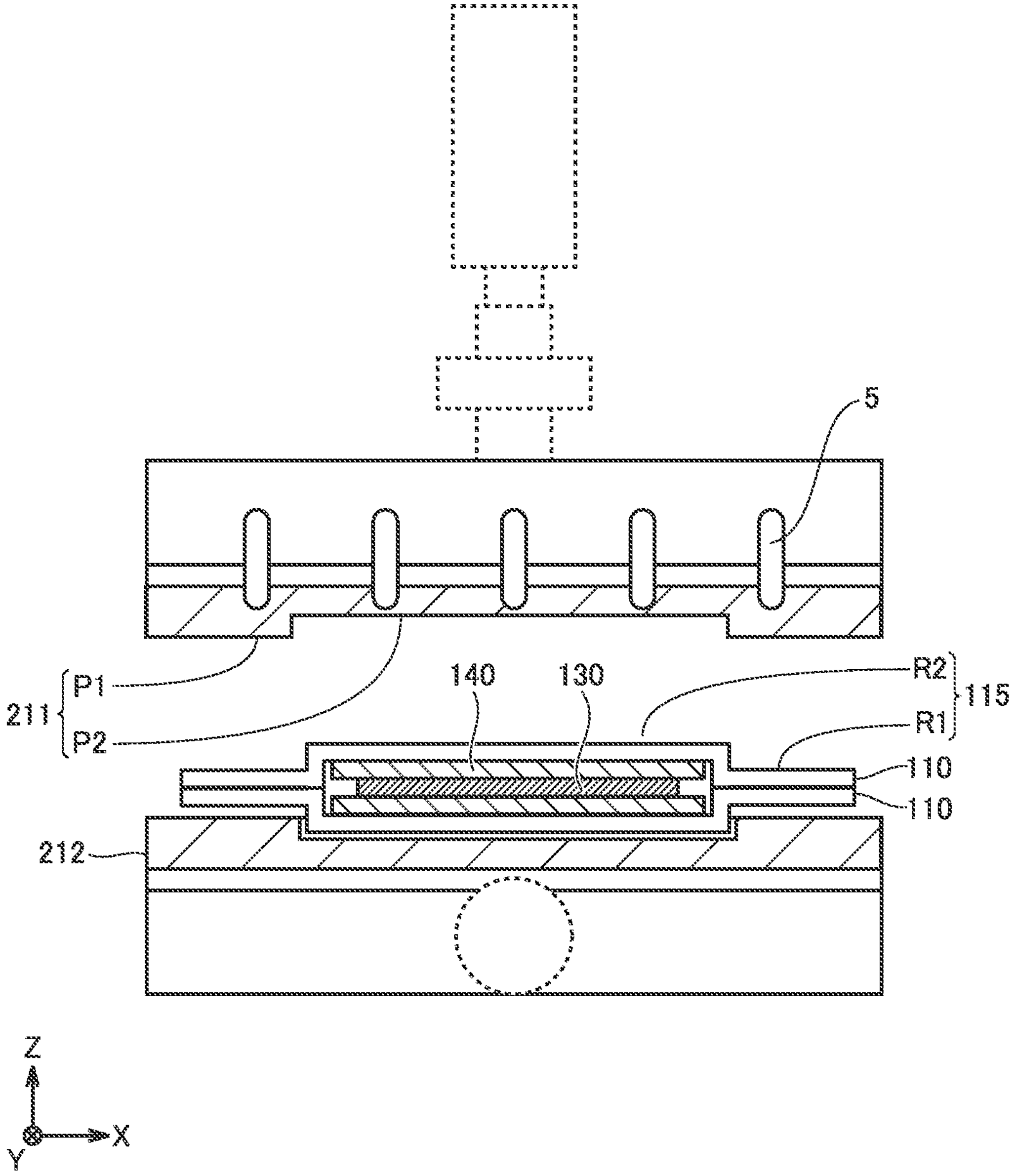
FIG. 4 is a second conceptual diagram showing the exemplary first horn and second horn according to the present embodiment.

FIG. 4 is a second conceptual diagram showing the exemplary first horn and second horn according to the present embodiment. Sealed portion 115 may include a first region R1 and a second region R2. In first region R1, portions of laminated casing 110 are welded to each other. In second region R2, electrode tab 130 is sandwiched between the portions of laminated casing 110. A tab film 140 may be interposed between electrode tab 130 and laminated casing 110.

First horn 211 may include, for example, a first portion P1 and a second portion P2. First portion P1 forms first region R1. Second portion P2 forms second region R2. In the thickness direction (Z axis direction) of laminated casing 110, second portion P2 is located backward with respect to first portion P1. Since second portion P2 is located backward, it is expected to attain a small pressure difference between first region R1 and second region R2. Thus, for example, it is expected to reduce a difference in welding strength between first region R1 and second region R2. As with first horn 211, second horn 212 may also include a first portion and a second portion.

For example, a slit 5 (through hole) may be formed in at least one of first horn 211 and second horn 212. By forming slit 5, it is expected to attain a uniform amplitude of the horn within the contact surface.

<Battery Production Apparatus>

Figure 5:
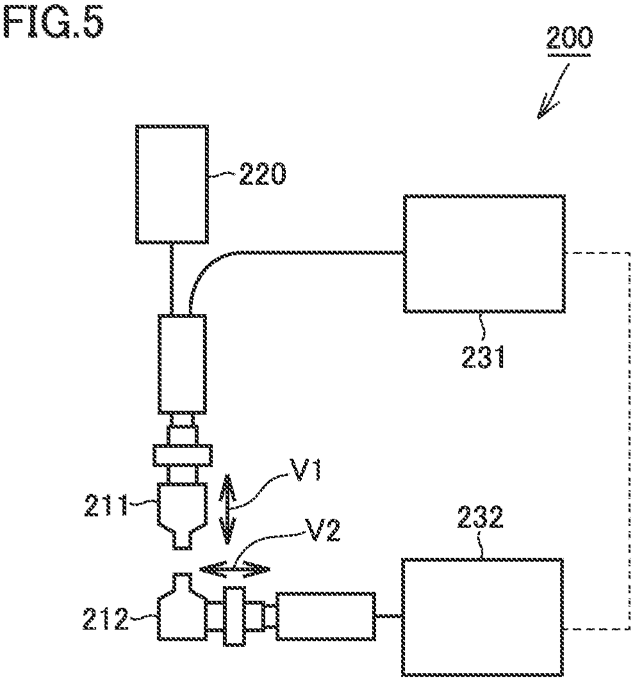
FIG. 5 is a conceptual diagram showing a battery production apparatus according to the present embodiment.

FIG. 5 is a conceptual diagram showing a battery production apparatus according to the present embodiment. Hereinafter, the "battery production apparatus according to the present embodiment" can be simply referred to as "the present production apparatus". The present production apparatus 200 includes first horn 211, second horn 212, pressure applying apparatus 220, first ultrasonic wave generating apparatus 231, and second ultrasonic wave generating apparatus 232. In the present production apparatus 200, the present production method described above can be performed. That is, the present production apparatus 200 can form sealed portion 115 at the peripheral edge of laminated casing 110 in which electrode assembly 120 is accommodated.

<<First and Second Horns>>

First horn 211 and second horn 212 are configured to sandwich at least a portion of the peripheral edge of laminated casing 110 between first horn 211 and second horn 212. First horn 211 is attached to first ultrasonic wave generating apparatus 231. Second horn 212 is attached to second ultrasonic wave generating apparatus 232. First horn 211 and second horn 212 may be replaceable. Details of first horn 211 and second horn 212 are as described above.

<<Pressure Applying Apparatus>>

Pressure applying apparatus 220 applies pressure applying force to at least one of first horn 211 and second horn 212. In FIG. 5, the pressure applying force is applied to first horn 211 as an example. The pressure applying force may be applied to second horn 212. The pressure applying force may be applied to both first horn 211 and second horn 212. Pressure applying apparatus 220 can apply the pressure applying force by any method. Pressure applying apparatus 220 may include, for example, an air cylinder, an actuator, a servo motor, and the like.

<<First and Second Ultrasonic Wave Generating Apparatus>>

First ultrasonic wave generating apparatus 231 is configured to apply, to first horn 211, ultrasonic vibration in first vibration direction V1. Second ultrasonic wave generating apparatus 232 is configured to apply, to second horn 212, ultrasonic vibration in second vibration direction V2. First vibration direction V1 is parallel to the thickness direction of laminated casing 110. Second vibration direction V2 is non-parallel to first vibration direction V1.

Second ultrasonic wave generating apparatus 232 generates ultrasonic vibration independently of first ultrasonic wave generating apparatus 231. For example, it is considered to apply ultrasonic vibration from one ultrasonic wave generating apparatus to both first horn 211 and second horn 212. In this case, the two horns are vibrated, so that the ultrasonic wave generating apparatus is required to attain a high output. Further, the vibration direction of first horn 211 or second horn 212 may be converted by a vibration direction converter. By the conversion of the vibration direction, vibration energy may be lost. Therefore, the output is required to be further increased. When two ultrasonic wave generating apparatuses are used and one horn is assigned to one ultrasonic wave generating apparatus, the output is expected to be reduced. The frequency of each of first ultrasonic wave generating apparatus 231 and second ultrasonic wave generating apparatus 232 may be, for example, 20 kHz or less, or 5 to 20 kHz.

Each of first ultrasonic wave generating apparatus 231 and second ultrasonic wave generating apparatus 232 may independently include an oscillator, a vibrator, a booster, or the like, for example. The oscillator can generate high-frequency power. The vibrator can convert the high-frequency power into ultrasonic vibration. The booster can adjust the amplitude of the ultrasonic vibration. The booster can transmit the ultrasonic vibration to the horn. Second ultrasonic wave generating apparatus 232 may generate ultrasonic vibration in synchronism with first ultrasonic wave generating apparatus 231, or may generate ultrasonic vibration not in synchronism with first ultrasonic wave generating apparatus 231.

<<Other Apparatuses etc.>>

The present production apparatus 200 may further include, for example, a stage (not shown), a driving apparatus (not shown), a controller (not shown) and the like. The stage can support a workpiece. The driving apparatus may drive first horn 211 in parallel with the thickness direction of the workpiece, for example. The controller may control individual operation, cooperation, and the like of each apparatus.

<Battery>

The present battery 100 is a laminate-type battery. The present battery 100 can be produced by the present production method. The present battery 100 can have, for example, a flat outer shape. The present battery 100 includes laminated casing 110 and electrode assembly 120 (see FIG. 2). The present battery 100 may further include, for example, electrode tab 130, tab film 140, and the like.

<<Electrode Assembly>>

Electrode assembly 120 is a power generation element. Electrode assembly 120 includes a positive electrode and a negative electrode. Electrode assembly 120 may include a bipolar electrode. Each of the electrodes may be in the form of a sheet. Electrode assembly 120 may further include, for example, a separator, an electrolyte, and the like. Electrode assembly 120 can have any form. Electrode assembly 120 may be, for example, of a wound type or stacked type.

<<Laminated Casing>>

Laminated casing 110 accommodates electrode assembly 120. When viewed in a plan view (FIG. 2), laminated casing 110 includes sealed portion 115 at the peripheral edge of laminated casing 110. Sealed portion 115 surrounds electrode assembly 120. Sealed portion 115 includes first region R1 and second region R2. In first region R1, the portions of laminated casing 110 are welded to each other. In second region R2, electrode tab 130 is sandwiched between the portions of laminated casing 110.

Figure 6:
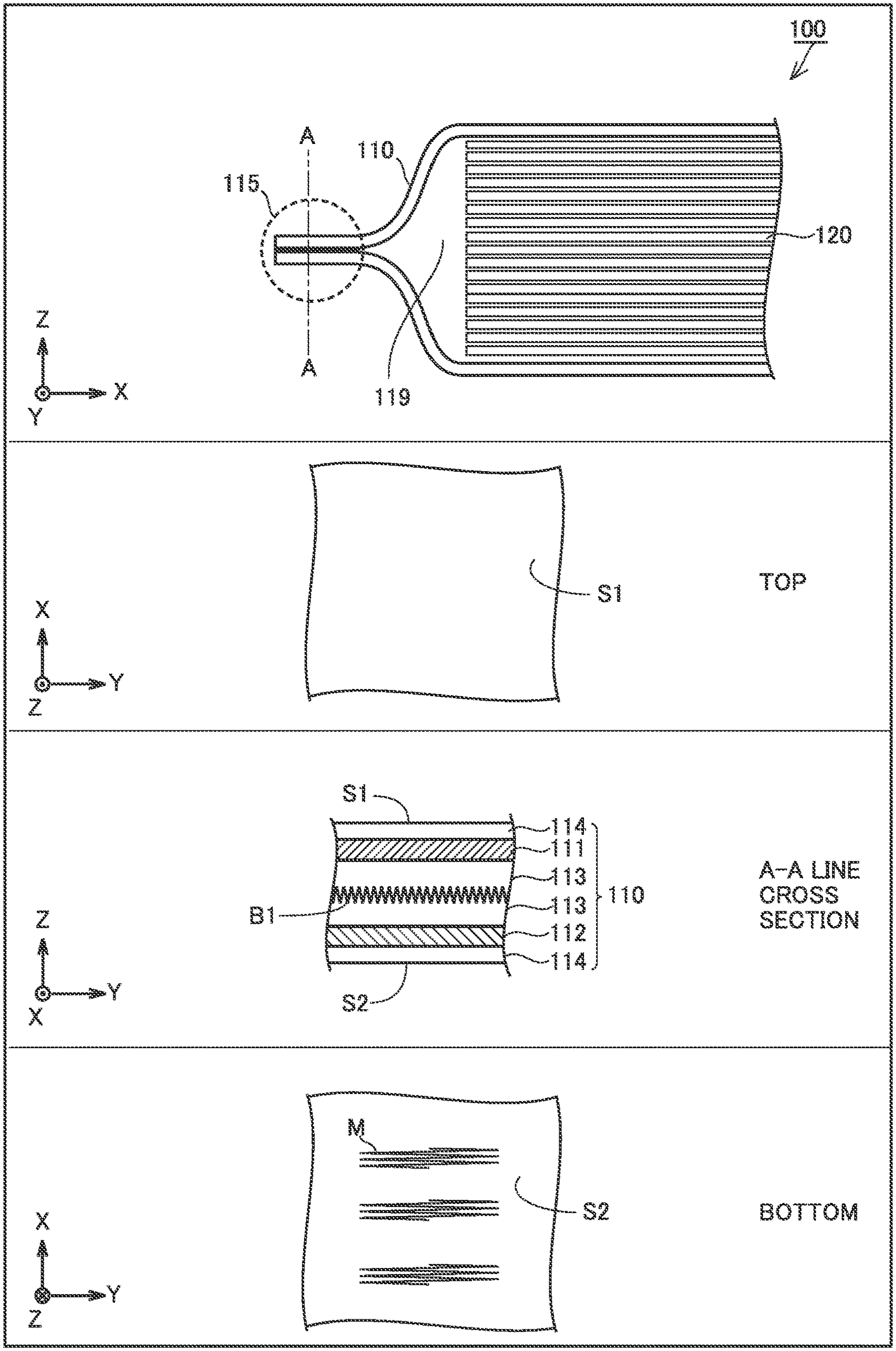
FIG. 6 is a conceptual diagram of the battery according to the present embodiment.

FIG. 6 is a conceptual diagram of the battery according to the present embodiment. In a cross section parallel to the XZ plane, laminated casing 110 (sealed portion 115) includes a first metal layer 111, a first resin layer 113, and a second metal layer 112. Laminated casing 110 may further include second resin layers 114. Laminated casing 110 may have a thickness of, for example, 50 to 500 μm as a whole.

First resin layer 113 is interposed between first metal layer 111 and second metal layer 112. First resin layer 113 is formed by welding two resin layers. First resin layer 113 includes a first joining interface B1. First joining interface B1 may have, for example, recesses/projections (undulations) with relatively short intervals. It is considered that the recesses/projections with short intervals result from the ultrasonic vibrations in the two directions. An interval of the recesses/projections may be, for example, 1 to 30 μm. An interval of the recesses/projections represents a distance between adjacent projections.

Second resin layers 114 cover the surfaces of laminated casing 110. Each of first resin layer 113 and second resin layers 114 may independently include polypropylene (PP), polyethylene terephthalate (PET), or the like, for example. Second resin layer 114 may have a composition that is the same as or different from that of first resin layer 113. First resin layer 113 may have a thickness of, for example, 10 to 200 μm. Second resin layer 114 may have a thickness of, for example, 5 to 50 μm.

Sealed portion 115 includes a first surface S1 and a second surface S2. Second surface S2 is a surface opposite to first surface S1. In FIG. 6, as an example, a processing mark M is formed on second surface S2. Processing mark M is formed on first surface S1 or second surface S2. That is, when processing mark M is formed on second surface S2, no processing mark M is formed on first surface S1. When processing mark M is formed on first surface S1, no processing mark M is formed on second surface S2.

Processing mark M extends in a direction orthogonal to the thickness direction of laminated casing 110. Processing mark M can be a streak-shaped scratch. Processing mark M may be referred to as processing scratch, welding mark, vibration mark, or the like. Processing mark M results from vibration in a direction intersecting the thickness direction of sealed portion 115. That is, it is considered that second horn 212 forms processing mark M. On the other hand, it is considered that processing mark M is less likely to be formed by vibration in the direction parallel to the thickness direction. In other words, it is considered that first horn 211 is less likely to form processing mark M.

The extending direction of processing mark M can include a component parallel to second vibration direction V2. The extending direction of processing mark M may be parallel to second vibration direction V2. For example, the amplitude of second horn 212 can determine the size of processing mark M. The size of processing mark M may be, for example, 10 to 40 μm. The size of processing mark M represents the maximum width thereof in the Y axis direction in FIG. 6.

Figure 7:
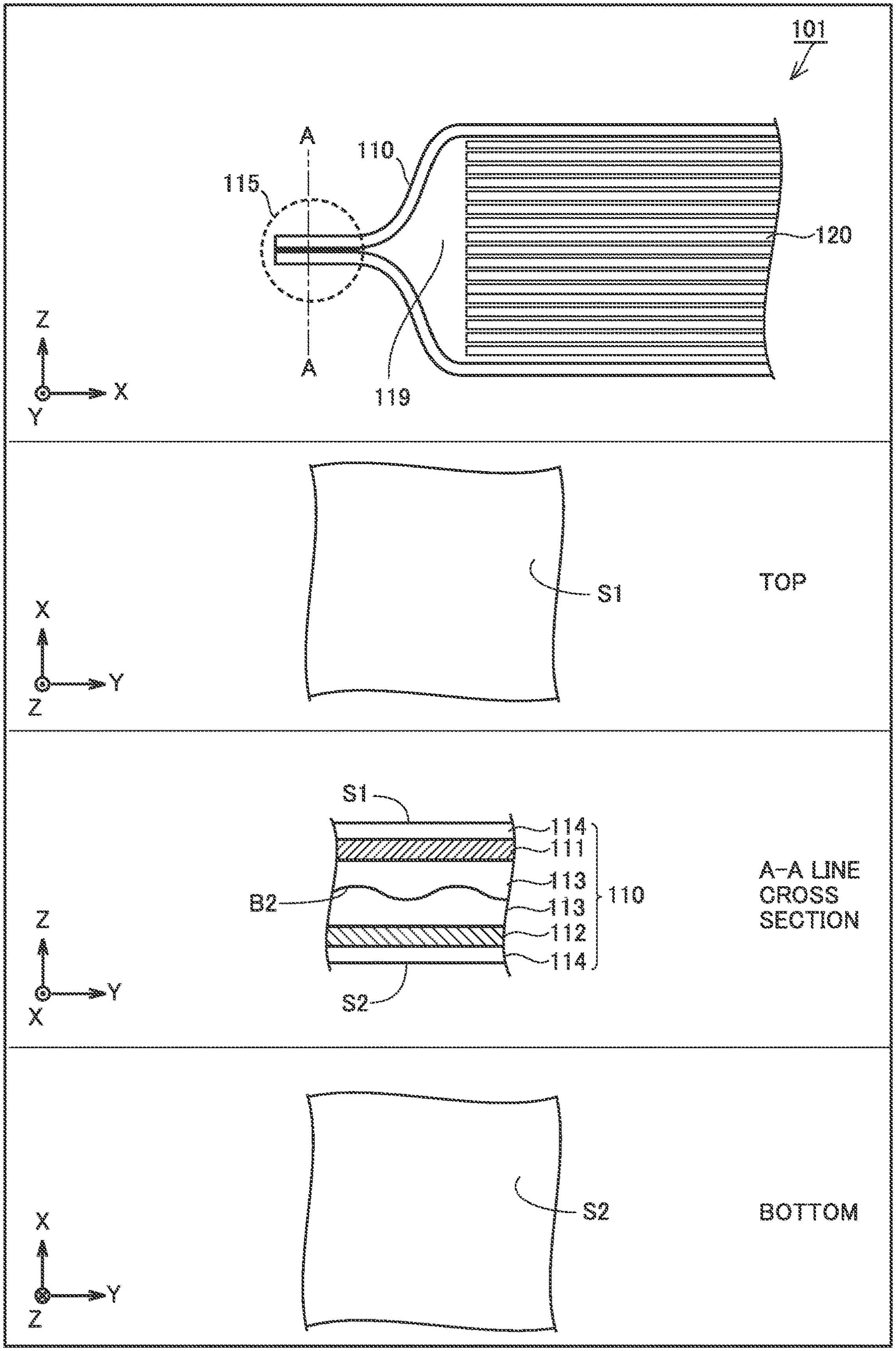
FIG. 7 is a conceptual diagram of a battery according to a reference embodiment.

FIG. 7 is a conceptual diagram of a battery according to a reference embodiment. Hereinafter, the "battery according to the reference embodiment" may be simply referred to as "reference battery". In reference battery 101, second horn 212 is vibrated in parallel with first horn 211, thereby forming a second joining interface B2. That is, both the two horns are vibrated in parallel with the thickness direction of laminated casing 110. In reference battery 101, second joining interface B2 may have undulations with intervals longer than those in first joining interface B1 (FIG. 6). In reference battery 101, none of first surface S1 and second surface S2 has processing mark M. Since second horn 212 is vibrated in the same direction as first horn 211, excessive damage may be provided to first metal layer 111 and second metal layer 112.

It should be noted that in the case of performing welding using a heat bar (in the case of heat sealing), it is considered that no undulations are formed at the joining interface.

<<Electrode Tab>>

Electrode tabs 130 is connected to electrode assembly 120 (a positive electrode or a negative electrode). Electrode tab 130 is led to the outside of laminated casing 110. Electrode tab 130 extends through second region R2 of sealed portion 115. Electrode tab 130 may function as, for example, an external terminal. An external terminal, a bus bar, or the like may be connected to electrode tab 130. Electrode tab 130 may include, for example, a metal plate or the like. Electrode tab 130 may include, for example, Al, nickel (Ni), copper (Cu), or the like.

In FIG. 2, two electrode tabs 130 (a positive electrode tab and a negative electrode tab) are led out from laminated casing 110 in opposite directions. For example, two electrode tabs 130 (the positive electrode tab and the negative electrode tab) may be led out from one side in the same direction.

<<Tab Film>>

Tab film 140 is interposed between electrode tab 130 and laminated casing 110. Tab film 140 may strengthen airtightness around electrode tab 130. Tab film 140 may include, for example, PP, PET, or the like.

The present embodiment is illustrative in any respect. The present embodiment is not restrictive. The technical scope of the present disclosure includes any modifications within the scope and meaning equivalent to the terms of the claims. For example, it is initially expected to extract freely configurations from the present embodiment and combine them freely.

What is claimed is:

1. A battery production method comprising:

(a) accommodating an electrode assembly in a laminated casing;

(b) forming a pressure-applied portion by sandwiching the laminated casing surrounding an entire perimeter of the electrode assembly between a first horn having a first tip formed as a first frame configured to surround the entire perimeter of the electrode assembly and a second horn having a second tip formed as a second frame configured to surround the entire perimeter of the electrode assembly; and (c) forming a sealed portion surrounding the entire perimeter of the electrode assembly by applying ultrasonic vibration from each of the first tip of the first horn and the second tip of the second horn to the pressure-applied portion, wherein the first horn has a first vibration direction, the second horn has a second vibration direction, the first vibration direction is parallel to a thickness direction of the laminated casing, the second vibration direction is non-parallel to the first vibration direction, and the second horn is vibrated in synchronism with the first horn.

2. The battery production method according to claim 1, wherein the second vibration direction is orthogonal to the first vibration direction.

3. The battery production method according to claim 1, wherein the first horn has an amplitude twice or less as large as a thickness of the laminated casing.

4. The battery production method according to claim 1, wherein at least one of the first horn and the second horn includes a knurled portion, and the knurled portion is in contact with the laminated casing.

5. The battery production method according to claim 1, wherein the sealed portion includes a first region and a second region, in the first region, portions of the laminated casing are welded to each other, in the second region, an electrode tab is sandwiched between the portions of the laminated casing, at least one of the first horn and the second horn includes a first portion and a second portion, the first portion forms the first region, the second portion forms the second region, and the second portion is located backward with respect to the first portion in the thickness direction of the laminated casing.

6. The battery production method according to claim 1, wherein the first frame includes a first pair of peripheral edge members spaced from each other such that the electrode assembly can be positioned therebetween, and the first frame includes a second pair of peripheral edge members extending between the first pair of peripheral edge members and spaced from each other such that the electrode assembly can be positioned therebetween.

7. The battery production method according to claim 1, wherein the first frame includes four peripheral edge members.

8. The battery production method according to claim 1, wherein the first frame includes a first pair of peripheral edge members spaced from each other such that the electrode assembly can be positioned therebetween, and the first frame includes a second pair of peripheral edge members extending from one edge member of the first pair of peripheral edge members to another edge member of the first pair of peripheral edge members and spaced from each other such that the electrode assembly can be positioned therebetween.

9. The battery production method according to claim 1, wherein the first frame includes four peripheral edge members that are continuous with each other.

10. A battery production apparatus for forming a sealed portion of a laminated casing in which an electrode assembly is accommodated with the sealed portion surrounding an entire perimeter of the electrode assembly, the battery production apparatus comprising:

a first horn having a first tip formed as a first frame configured to surround the entire perimeter of the electrode assembly;

a second horn having a second tip formed as a second frame configured to surround the entire perimeter of the electrode assembly;

a pressure applying apparatus;

a first ultrasonic wave generating apparatus; and a second ultrasonic wave generating apparatus, wherein the first tip of the first horn and the second tip of the second horn are configured to sandwich the laminated casing around the entire perimeter surrounding the electrode assembly between the first tip of the first horn and the second tip of the second horn, the pressure applying apparatus is configured to apply pressure applying force to at least one of the first horn and the second horn, the first ultrasonic wave generating apparatus is configured to apply, to the first horn, ultrasonic vibration in a first vibration direction, the second ultrasonic wave generating apparatus is configured to apply, to the second horn, ultrasonic vibration in a second vibration direction, the first vibration direction is parallel to a thickness direction of the laminated casing, the second vibration direction is non-parallel to the first vibration direction, and the second horn is vibrated in synchronism with the first horn.

11. The battery production apparatus according to claim 10, wherein the second vibration direction is orthogonal to the first vibration direction.

12. The battery production apparatus according to claim 10, wherein at least one of the first horn and the second horn includes a knurled portion, and the knurled portion is configured to be in contact with the laminated casing.

13. The battery production apparatus according to claim 10, wherein the sealed portion includes a first region and a second region, in the first region, portions of the laminated casing are welded to each other, in the second region, an electrode tab is sandwiched between the portions of the laminated casing, at least one of the first horn and the second horn includes a first portion and a second portion, the first portion is configured to form the first region, the second portion is configured to form the second region, and the second portion is located backward with respect to the first portion in the thickness direction of the laminated casing.

14. The battery production apparatus according to claim 10, wherein the first frame includes a first pair of peripheral edge members spaced from each other such that the electrode assembly can be positioned therebetween, and the first frame includes a second pair of peripheral edge members extending between the first pair of peripheral edge members and spaced from each other such that the electrode assembly can be positioned therebetween.

15. The battery production apparatus according to claim 10, wherein the first frame includes four peripheral edge members.

16. The battery production apparatus according to claim 15, wherein the four peripheral edge members are continuous with each other.

17. The battery production apparatus according to claim 10, wherein the first frame includes a first pair of peripheral edge members spaced from each other such that the electrode assembly can be positioned therebetween, and the first frame includes a second pair of peripheral edge members extending from one edge member of the first pair of peripheral edge members to another edge member of the first pair of peripheral edge members and spaced from each other such that the electrode assembly can be positioned therebetween.

* * * * *